United States Patent
Kim et al.

(10) Patent No.: US 8,194,264 B2
(45) Date of Patent: Jun. 5, 2012

(54) METHOD AND APPARATUS FOR PRINTING USING SYNCHRONIZATION SIGNAL

(75) Inventors: Jin-ha Kim, Seongnam-si (KR); Doo-hyo Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1321 days.

(21) Appl. No.: 11/601,729

(22) Filed: Nov. 20, 2006

(65) Prior Publication Data

US 2007/0216936 A1    Sep. 20, 2007

(30) Foreign Application Priority Data

Mar. 14, 2006   (KR) .................. 10-2006-0023569

(51) Int. Cl.
*G06K 15/00* (2006.01)
*H04N 1/36* (2006.01)
*G06F 1/30* (2006.01)
*G06F 1/32* (2006.01)

(52) U.S. Cl. ....... 358/1.14; 358/409; 358/410; 713/320; 713/375; 713/400

(58) Field of Classification Search .............. 713/320, 713/375, 400
See application file for complete search history.

(56) References Cited

U.S. PATENT DOCUMENTS

| | | | | |
|---|---|---|---|---|
| 5,406,132 A | * | 4/1995 | Housako | 327/172 |
| 6,317,560 B1 | * | 11/2001 | Kawabata | 396/2 |
| 6,552,304 B1 | * | 4/2003 | Hirose et al. | 219/216 |
| 2003/0055888 A1 | * | 3/2003 | Matsumoto et al. | 709/203 |
| 2005/0078975 A1 | * | 4/2005 | Chae | 399/88 |
| 2006/0066929 A1 | * | 3/2006 | Miyazawa et al. | 358/540 |
| 2006/0099002 A1 | * | 5/2006 | Kim | 399/69 |

FOREIGN PATENT DOCUMENTS

| | | | |
|---|---|---|---|
| CN | 1144098 | | 3/2004 |
| JP | 2002-174994 | | 6/2002 |
| JP | 2003-091186 | | 3/2003 |
| JP | 2003-195680 | | 7/2003 |
| JP | 2005338634 A | * | 12/2005 |

* cited by examiner

*Primary Examiner* — Thomas Lett
(74) *Attorney, Agent, or Firm* — Roylance, Abrams, Berdo & Goodman, LLC

(57) ABSTRACT

A method and apparatus for printing using a synchronization signal are provided. Printing processes are performed in the apparatus by determining points in time for performing the printing processes based on a synchronization signal so that it is possible to reduce a waiting time for printing.

5 Claims, 5 Drawing Sheets

METHOD AND APPARATUS FOR PRINTING USING SYNCHRONIZATION SIGNAL

CROSS-REFERENCE TO RELATED PATENT APPLICATION

This application claims the benefit under 35 U.S.C. §119(a) of Korean Patent Application No. 10-2006-0023569, filed on Mar. 14, 2006, in the Korean Intellectual Property Office, the entire disclosure of which is hereby incorporated by reference.

BACKGROUND OF THE INVENTION

1. Field of the Invention

The present invention relates to an image forming apparatus such as a printer, a facsimile, or a multifunctional peripheral device. More particularly, the present invention relates to a method and an apparatus for controlling printing processes performed in an image forming apparatus.

2. Description of Related Art

It is desirable to minimize a wait time of a user from the time an image forming apparatus is turned on to the completion of a printing processes. In a conventional image forming apparatus, when a microprocessor unit (MPU) requests information about the current states of units performing the printing processes, the units output the information about the current states of the units in response to the request. When the MPU outputs control signals for controlling the printing processes to be performed in the units by using the output information about the current states of the units, the units perform the printing processes according to the control signals and output the results of processing the control signals to the MPU.

Accordingly, the waiting time includes the time required for the units to respond to the MPU with the results of processing the control signals and the information about the current states of the units.

Accordingly, there is a need for an improved system and method for printing using a synchronization signal capable of performing printing processes in an image forming apparatus.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for printing using a synchronization signal capable of performing printing processes in an image forming apparatus by determining points in time for performing the printing processes are performed based on the synchronization signal.

According to an aspect of the present invention, a method of printing using a synchronization signal is provided. A synchronization signal is generated and the performance of printing processes is instructed. The instructed printing processes are performed based on the synchronization signal.

The instructed printing processes are performed which may include determining points in time for performing the instructed printing processes based on the synchronization signal.

The instructed printing processes are performed and may further include performing the instructed printing processes according to the results of determining.

Printing using a synchronization signal may further include selecting one of a plurality of modes in which points in time for performing the printing processes are determined according to the synchronization signal, and the instructing of the performance of printing processes comprises instructing the performance of the printing processes according to the selected mode.

According to another aspect of the present invention, a computer-readable medium having embodied thereon a computer program for executing the above-mentioned method is provided.

According to another aspect of the present invention, an apparatus for printing using a synchronization signal is provided. A controller generates a synchronization signal and instructs the performance of printing processes. A printing process performing unit performs the printing processes according to the instructions based on the synchronization signal.

The printing process performing unit may determine points in time for performing the printing processes based on the synchronization signal.

The controller may include a synchronization signal generator and a printing process controller. The synchronization signal generator generates the synchronization signal and the printing process controller generates control signals for controlling the printing processes at points in time based on the synchronization signal. The printing process controller may perform the printing processes based on the synchronization signal in response to the control signals.

The apparatus for printing using a synchronization signal may further include a mode storage unit and a mode selecting unit. The mode storage unite stores a plurality of modes in which points in time for performing the printing processes are determined according to the synchronization signal. The mode selecting unit selects one of the modes stored in the mode storage unit. The controller may control the printing processes according to the selected mode.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
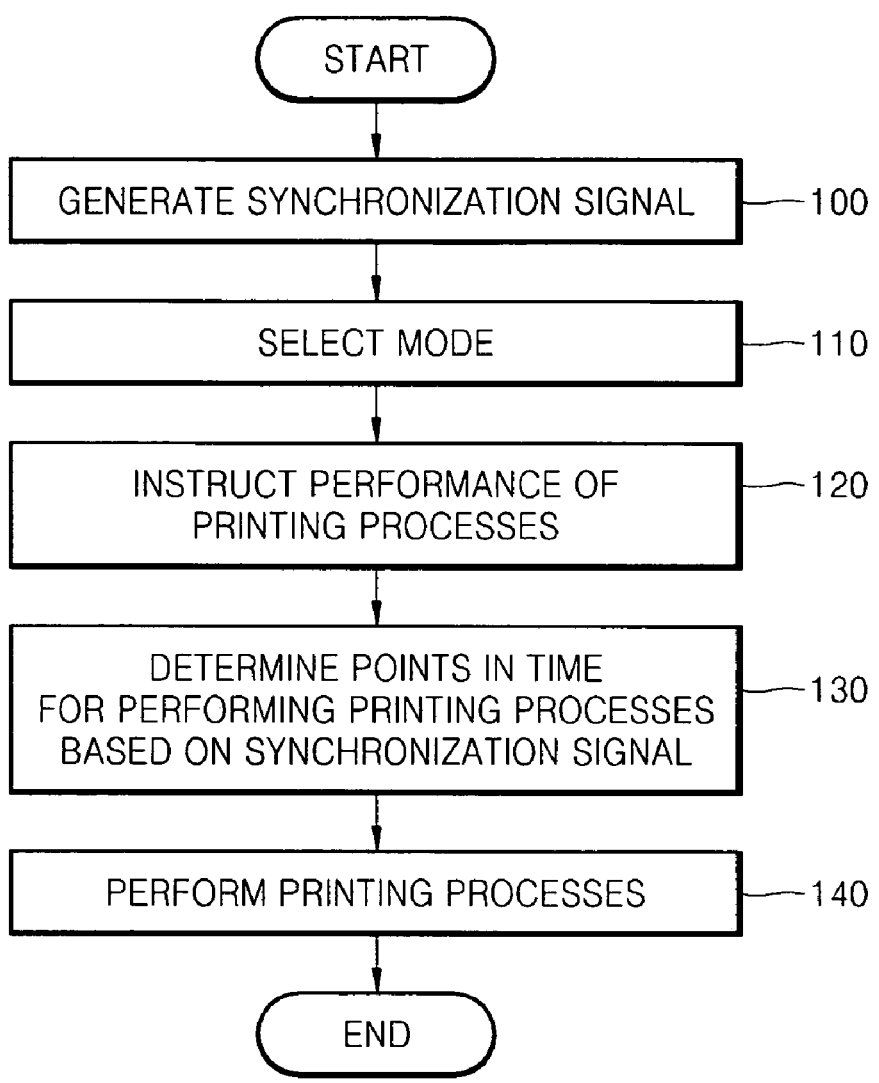
FIG. 1 is a flowchart illustrating a method of printing using a synchronization signal according to an exemplary embodiment of the present invention.
Figure 2:
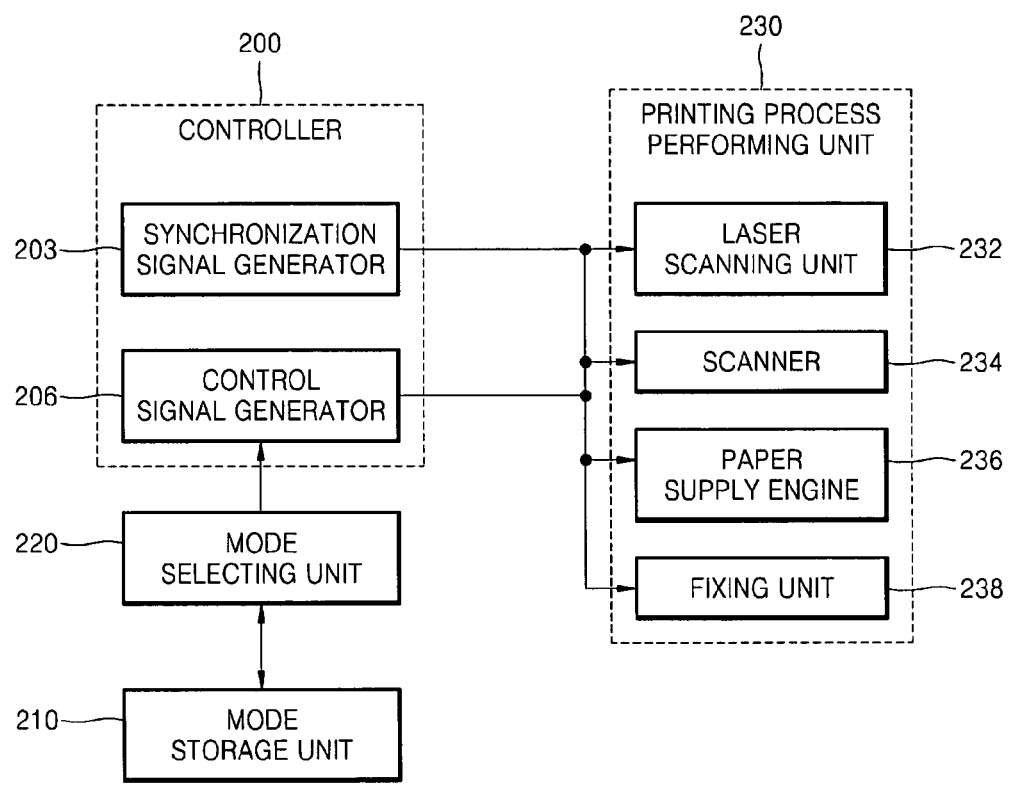
FIG. 2 is a block diagram illustrating an apparatus for printing using a synchronization signal according to an exemplary embodiment of the present invention.

FIG. 1 is a flowchart illustrating a method of printing using a synchronization signal according to an exemplary embodiment of the present invention. FIG. 2 is a block diagram illustrating an apparatus for printing using a synchronization signal according to an exemplary embodiment of the present invention. The method of printing using a synchronization signal according to the exemplary embodiment of the present invention will now be described with reference to FIGS. 1 and 2.

First, a synchronization signal generator 203 of a controller 200 generates a synchronization signal (step 100). According to an exemplary implementation, the synchronization signal is used to designate a reference point in time for controlling and performing printing processes.

A mode selecting unit 220 selects a mode from among a plurality of modes in which the points in time at which the printing processes are to be performed are determined according to the synchronization signal (step 110). A mode is selected from among a plurality of modes in step 110. The plurality of modes are determined in advance based on experimental results, and stored in a mode storage unit 210.

A control signal generator 206 instructs a printing process performing unit 230 to perform the printing processes at the required points in time based on the synchronization signal generated in step 100 according to the mode selected in step 110 (step 120).

A laser scanning unit 232, a scanner 234, a paper supply engine 236, and a fixing unit 238 of the printing process performing unit 230 determine the points in time for performing the printing processes instructed in step 120 based on the synchronization signal generated in step 100 (step 130).

The laser scanning unit 232, the scanner 234, the paper supply engine 236, and the fixing unit 238 perform the printing processes instructed in step 120 at the points in time determined in step 130 (step 140).

The apparatus for printing using a synchronization signal according to an exemplary embodiment of the present invention will now be described with reference to FIG. 2.

A controller 200 generates a synchronization signal and controls printing processes performed in an image forming apparatus based on the synchronization signal. The controller 200 includes a synchronization signal generator 203 and a control signal generator 206.

The synchronization signal generator 203 generates the synchronization signal. The synchronization signal is used to designate a reference point in time for controlling or for performing printing processes, which are controlled or performed by a laser scanning unit 232, a scanner 234, a paper supply engine 236, and a fixing unit 238 of a printing process performing unit 230 according to control signals output from the control signal generator 206.

The control signal generator 206 generates the control signals for controlling the printing processes to be performed in the laser scanning unit 232, the scanner 234, the paper supply engine 236, and the fixing unit 238. The printing processes are performed according to points in time based on the synchronization signal generated by the synchronization signal generator 203. In this regard, the control signal generator 206 is controlled by a control table stored in a mode storage unit 210 according to a mode selected by a mode selecting unit 220.

The control table stored in the mode storage unit 210 includes information regarding a plurality of modes in which the points in time for performing the printing processes are determined according to the synchronization signal. Examples of the modes stored in the mode storage unit 210, as illustrated in FIG. 3D, include a warm up mode 300, a print mode 310, a ready mode 320, and a termination mode 330. The information of the control table stored in the mode storage unit 210 is determined based on experimental results for each mode.

The mode selecting unit 220 selects a mode in which the image forming apparatus is to operate from the modes stored in the mode storage unit 210.

The printing process performing unit 230 performs the printing processes in response to the control signals output from the control signal generator 206. The printing process performing unit 230 performs the printing processes by determining the points in time for performing the printing processes based on the synchronization signal generated by the synchronization signal generator 203.

The printing processes are performed by the laser scanning unit 232, the scanner 234, the paper supply engine 236, and the fixing unit 238. According to an exemplary implementation, the laser scanning unit 232, the scanner 234, the paper supply engine 236, and the fixing unit 238 perform the printing processes in response to the control signals output from the control signal generator 206 by determining the points in time for performing the printing processes based on the synchronization signal generated by the synchronization signal generator 206.

The laser scanning unit 232 receives an image signal and scans a laser beam generated by a light source such as a laser diode onto a photo sensitive medium such as an optical photo conductor drum to form an electrostatic latent image.

The scanner 234 performs scan processes by scanning light onto a document and by using light reflected from the document.

The paper supply engine 236 supplies or ejects a to-be-fed printing medium such as printing paper along predetermined paper feeding path.

The fixing unit 238 included in the image forming apparatus fixes a developer on the printing medium by using heat.

Figure 3:
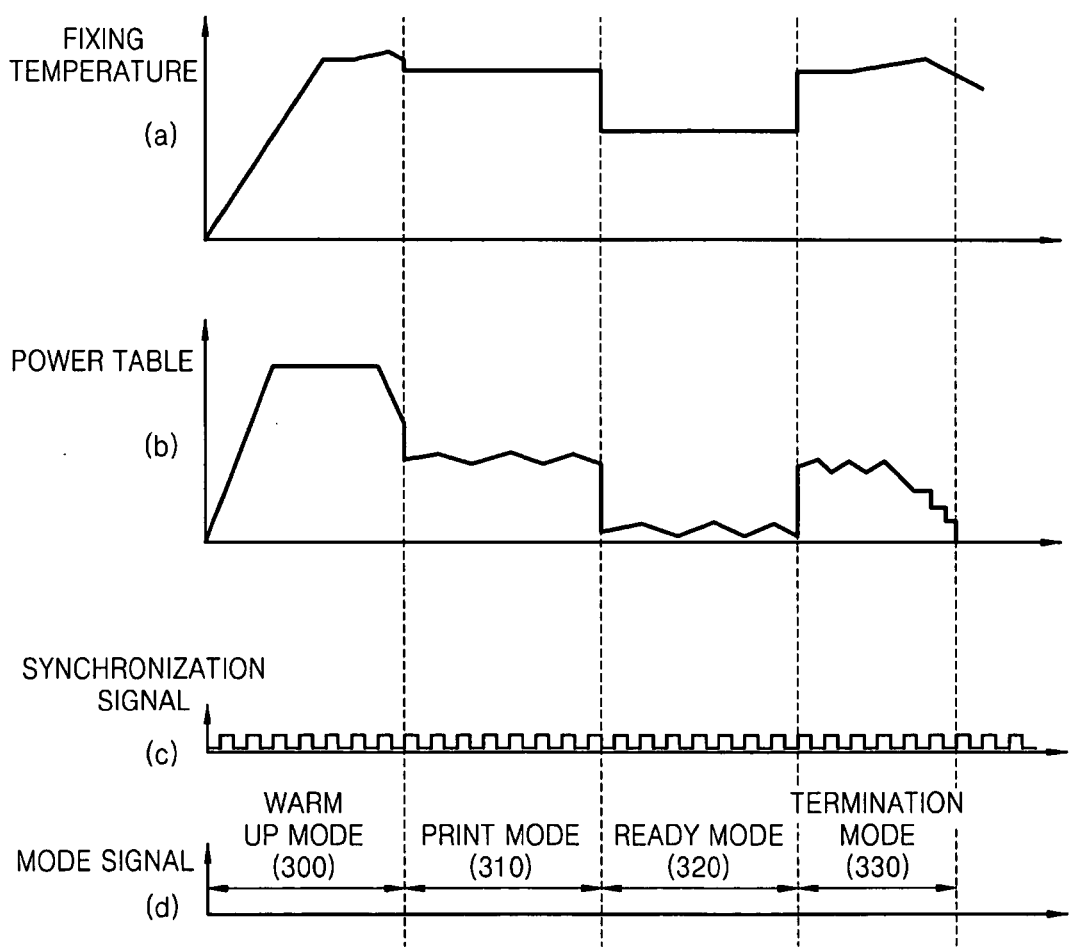
FIG. 3 is a timing diagram explaining printing processes performed in a fixing unit in the method and apparatus of FIGS. 1 and 2.

FIG. 3 is a timing diagram explaining printing processes performed in a fixing unit in the method and apparatus of FIGS. 1 and 2.

The modes for printing processes performed in the fixing unit 238 include the warm up mode 300, the print mode 310, the ready mode 320, and the termination mode 330. These modes are stored in the mode storage unit 210.

The mode selecting unit 220 selects the warm up mode 300, the print mode 310, the ready mode 320, or the termination mode 330 according to the progress of the printing process. The control signal generator 206 generates the control signals for controlling fixing processes performed by the fixing unit 238 according to the mode selected by the mode selecting unit 220. The fixing unit 238 determines the points in time at which the fixing processes are performed based on the synchronization signal and performs the fixing processes in response to the control signals generated by the control signal generator 206.

Figure 4A:
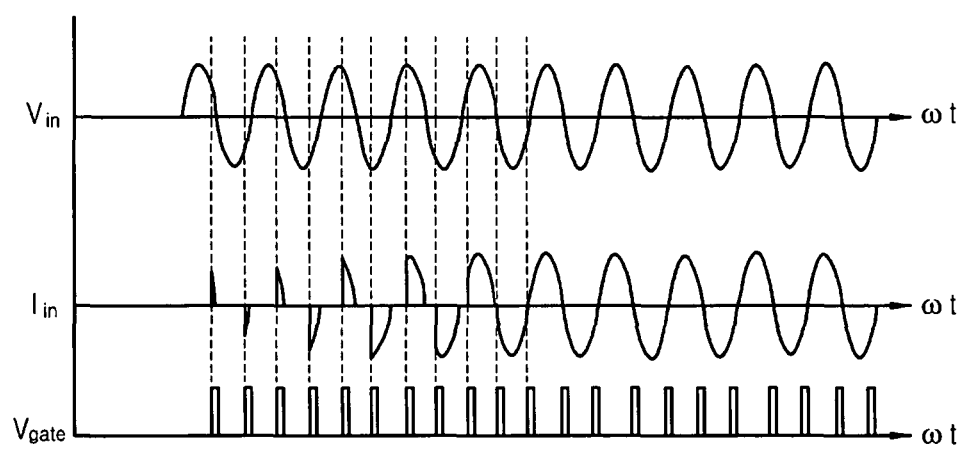
FIGS. 4A and 4B are graphs explaining printing processes performed in a warm up mode in a method and apparatus for printing using a synchronization signal according to an exemplary embodiment of the present invention.
Figure 4B:
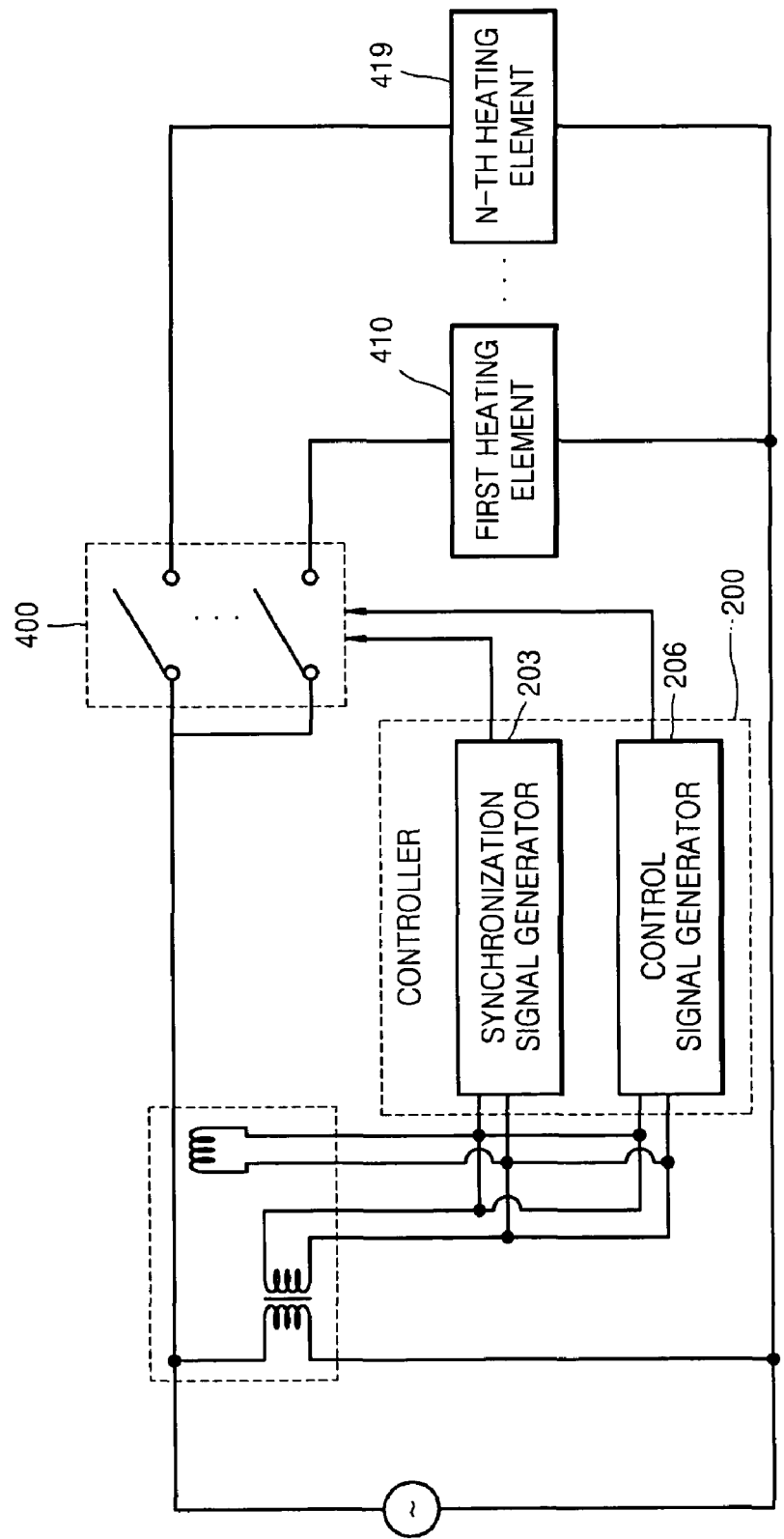

In the warm up mode 300, an inrush current is reduced based on a phase signal and the level of input power so that soft starting can be controlled. For example, in the warm up mode 300, as illustrated in FIG. 4A, the input power increases gradually as a conduction angle increases gradually from an initial value of 0. In FIG. 4B, a switch controller 400 gradually increases the number of first through n-th heating elements 410 to 419 that receive power. This increase is made in the warm up mode 300.

In the print mode 310, the amount of power required for the fixing processes is controlled to thoroughly distribute the power into sine waves with a nominal carrier.

In the ready mode 320, the amount of power is controlled to distribute the power into sine waves within 30% of a rated power.

In the termination mode 330, the power supply is reduced so that soft termination is possible.

According to an exemplary implementation, the fixing unit 238 performs the processes for the modes according to the predetermined control table for the modes based on the synchronization signal generated by the synchronization signal generator 203.

According to the method and apparatus for printing using a synchronization signal of the present invention, the printing processes performed in an image forming apparatus are performed by determining the points in time for performing the printing processes based on the synchronization signal.

Accordingly, time is not required for the units to respond to the request of a microprocessor unit (MPU) with information about the current states of the units and the results of processing the control signals. Also, the units perform the printing processes at predetermined times based on the synchronization signal. As a result, the waiting time for printing can be reduced.

The present invention can also be embodied as computer readable codes on a computer readable recording medium. The computer includes any device having information processing capabilities. The computer readable recording medium is any data storage device that can store data which can be thereafter read by a computer system. Examples of the computer readable recording medium include read-only memory (ROM), random-access memory (RAM), CD-ROMS, magnetic tapes, hard disks, floppy disks, and optical data storage devices. The computer readable recording medium can also be distributed over network-coupled computer systems so that the computer readable codes is stored and executed in a distributed fashion. Also, functional programs, codes, and code segments for accomplishing the present invention can be easily construed as within the scope of the invention by programmers skilled in the art to which the present invention pertains.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of printing using a synchronization signal, the method comprising the steps of:
generating a synchronization signal to be used to designate a reference point in time for controlling and performing printing processes irrespective of a microprocessor unit (MPU);
selecting one from among a plurality of modes in which points in time at which corresponding printing processes are to be performed are determined according to the synchronization signal;
instructing a printing process performing unit to perform the printing processes at the corresponding points in time based on the synchronization signal according to the selected mode;
determining the points in time for performing the instructed printing processes based on the synchronization signal; and
performing the instructed printing processes based on the synchronization signal at the points in time determined;
wherein the plurality of modes comprise warm-up mode, print mode, ready mode and termination mode.

2. The method of claim 1, wherein the plurality of modes are determined in advance and based on experimental results, and stored in a storage unit.

3. The method of claim 1, wherein the printing process performing unit includes a laser scanning unit, a scanner, a paper supply engine, and a fixing unit.

4. A non-transitory computer-readable medium having embodied thereon a computer program for executing a method of printing using a synchronization signal, the method comprising the steps of:
generating a synchronization signal to be used to designate a reference point in time for controlling and performing printing processes irrespective of a microprocessor unit (MPU);
selecting one from among a plurality of modes in which points in time at which corresponding printing processes are to be performed are determined according to the synchronization signal;
instructing a printing process performing unit to perform the printing process at the corresponding points in time based on the synchronization signal according to the selected mode;
determining the points in time for performing the instructed printing processes based on the synchronization signal; and
performing the instructed printing processes based on the synchronization signal at the points in time determined;
wherein the plurality of modes comprise warm-up mode, print mode, ready mode and termination mode.

5. An apparatus for printing using a synchronization signal, the apparatus comprising:
a controller for generating a synchronization signal and instructing performance of printing processes, which comprises a synchronization signal generator for generating the synchronization signal;
a printing process controller for generating control signals for controlling the printing processes at points in time based on the synchronization signal;
a printing process performing unit for performing the printing processes according to the instructions based on the synchronization signal; and
a mode storage unit for storing a plurality of modes in which points in time for performing the printing processes are determined according to the synchronization signal; and
a mode selecting unit for selecting one of the modes stored in the mode storage unit;
wherein the controller controls the printing processes according to the selected mode;
wherein the plurality of modes comprise warm-up mode, print mode, ready mode and termination mode;
wherein the printing process performing unit determines points in time for performing the printing processes based on the synchronization signal; and
wherein the printing process performing unit performs the printing processes based on the synchronization signal in response to the control signals.

* * * * *